US012646317B2

(12) United States Patent
Murphy-Chutorian et al.

(10) Patent No.: US 12,646,317 B2
(45) Date of Patent: Jun. 2, 2026

(54) SKY BACKGROUND MODEL

(71) Applicant: Niantic Spatial, Inc, San Francisco, CA (US)

(72) Inventors: Erik Marshall Murphy-Chutorian, Palo Alto, CA (US); Nicholas John Butko, Cupertino, CA (US)

(73) Assignee: Niantic Spatial, Inc, San Francisco, CA (US)

( * ) Notice: Subject to any disclaimer, the term of this patent is extended or adjusted under 35 U.S.C. 154(b) by 10 days.

(21) Appl. No.: 18/537,698

(22) Filed: Dec. 12, 2023

(65) Prior Publication Data

US 2025/0191363 A1 Jun. 12, 2025

(51) Int. Cl.
*G06V 20/20* (2022.01)
*G06V 20/70* (2022.01)

(52) U.S. Cl.
CPC .............. *G06V 20/20* (2022.01); *G06V 20/70* (2022.01)

(58) Field of Classification Search
CPC ................................ G06V 20/20; G06V 20/70
See application file for complete search history.

(56) References Cited

U.S. PATENT DOCUMENTS

2007/0297683 A1* 12/2007 Luo ......................... G06V 20/10
382/192
2012/0033875 A1* 2/2012 Bergman .................. G06T 7/11
382/164

2017/0236287 A1* 8/2017 Shen ...................... G06F 18/295
382/206
2017/0294000 A1* 10/2017 Shen ...................... G06F 3/0482
2019/0202349 A1 7/2019 Winton et al.
2019/0222776 A1 7/2019 Carter et al.
2021/0272245 A1* 9/2021 Gao ......................... G06F 18/25
2022/0012893 A1 1/2022 Jafek
2022/0230323 A1* 7/2022 Liba ..................... G06V 10/764
2022/0319016 A1 10/2022 Graber et al.

(Continued)

FOREIGN PATENT DOCUMENTS

KR 20100115211 A 10/2010

OTHER PUBLICATIONS

Halperin, T, et al., "Clear Skies Ahead: Towards Real-Time Automatic Sky Replacement in Video," Computer Graphics Forum, Mar. 6, 2019, vol. 38, No. 2, pp. 207-218.

(Continued)

*Primary Examiner* — Jitesh Patel
(74) *Attorney, Agent, or Firm* — Fenwick & West LLP

(57) ABSTRACT

An AR client device generates and uses a background model to identify portions of images that depict the sky. A background model is a model that represents where the sky is visible for the client device. To identify a sky background portion of an image, a client device can map an image onto the background model and thereby determine which portion of the image represents the sky. The client device can use the identified sky background portion to augment the image to include AR content in the sky. To generate the background model, the client device applies a background detection model to a set of images to generate background probability images. The background probability images are mapped onto a background model using orientation data captured by the client device to update the background model based on the background probability image.

20 Claims, 9 Drawing Sheets

(56) References Cited

U.S. PATENT DOCUMENTS

2022/0383508 A1* 12/2022 Liu ........................ G06V 10/82
2023/0014448 A1    1/2023 Morin et al.

OTHER PUBLICATIONS

Nice, K., et al., "Sky pixel detection in outdoor imagery using an adaptive algorithm and machine learning," Urban Climate, Mar. 1, 2020, vol. 31, pp. 1-17.
Tran, A., et al., "Fakeye: Sky Augmentation with Real-time Sky Segmentation and Texture Blending," CVPR Fourth Workshop on Computer Vision for Augmented and Virtual Reality, Jun. 14, 2020, p. 1.
PCT International Search Report and Written Opinion, PCT Application No. PCT/IB2024/062533, Apr. 3, 2025, 10 pages.
United States Office Action, U.S. Appl. No. 18/537,699, filed Dec. 4, 2025, 14 pages.

* cited by examiner

200

300

SKY BACKGROUND MODEL

BACKGROUND

1. Technical Field

The subject matter described relates generally to augmented reality (AR) content, and, in particular, to identifying portions of an image that depict the sky.

2. Problem

Augmented-reality (AR) devices provide an AR experience by modifying images to include AR content. Commonly, an AR device generates a model of the physical world around the device to determine how to render content that should appear near the user. For example, to display an AR monkey hanging from a real tree, an AR device generally creates a virtual model of the tree, localizes AR device and the AR monkey within that virtual model, and renders the AR monkey at that virtual location. While this approach may be effective for the immediate vicinity around an AR device, it is much less effective when AR content should appear far away from users. An AR device would generally have to model all physical objects between its location and where the AR content should be presented, which would be a prohibitively large model. Some AR devices use computer-vision machine-learning models to segment an image and predict how AR content should be presented at a distance. However, these models can require significant computing resources to execute, especially when applied to frames in a video as the AR device captures that video. Thus, these models are generally ineffective for the relatively light-weight computational power of most AR devices.

SUMMARY

An AR client device generates and uses a background model to identify portions of images that depict the sky (or other background features). A background model is a model that represents where the sky is visible for the client device. To identify a sky background portion of an image, a client device can map an image onto the background model and thereby determine which portion of the image represents the sky. The client device can use the identified sky background portion to augment the image to include AR content in the sky.

To generate the background model, the client device applies a background detection model to a set of images captured by the client device. A background detection model is a machine-learning model that is trained to generate a background probability image, which is an image whose pixels indicate whether a corresponding pixel in the original image depicts the sky. The client device maps this background probability image onto a background model using orientation data captured by the client device to update the background model based on the background probability image.

By generating an using a background model, the client device avoids having to generate a virtual model for AR object to be rendered to appear far away from the client device. Instead, the background model can simply be a plane or some other 3D structure that indicates where the client device can see the sky. Furthermore, by using the background model, the client device can reduce the number of frames to which it must apply a background detection model, thereby reducing the computational resources required by the client device to provide AR content.

DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Figure 1:
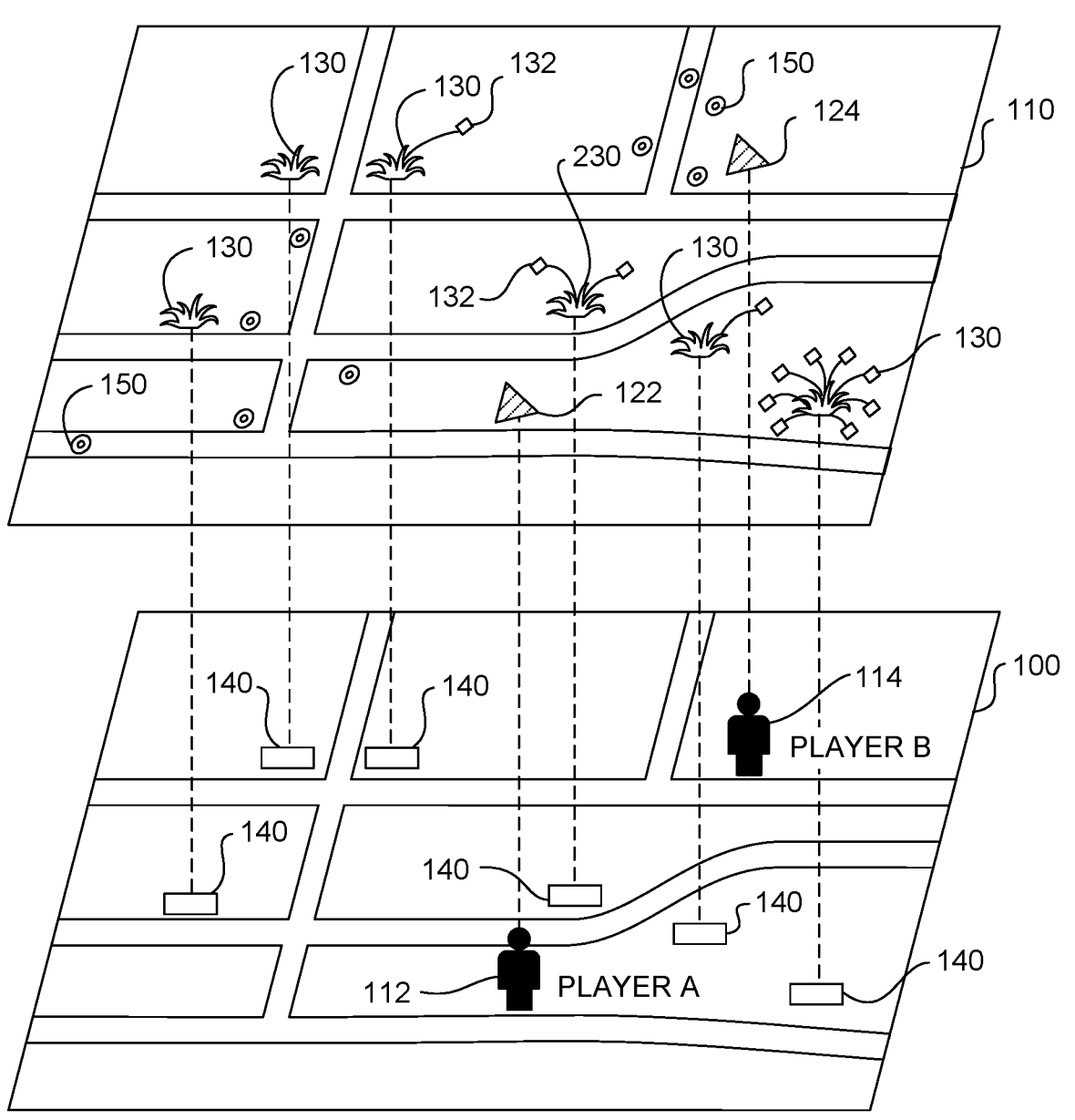
FIG. 1 depicts a representation of a virtual world having a geography that parallels the real world, according to one embodiment.

Various embodiments are described in the context of a parallel reality game that includes augmented reality content in a virtual world geography that parallels at least a portion of the real-world geography such that player movement and actions in the real-world affect actions in the virtual world. The subject matter described is applicable in other situations where providing AR content using a background model is desirable. In addition, the inherent flexibility of computer-based systems allows for a great variety of possible configurations, combinations, and divisions of tasks and functionality between and among the components of the system.
Example Location-Based Parallel Reality Game FIG. 1 is a conceptual diagram of a virtual world 110 that parallels the real world 100. The virtual world 110 can act as the game board for players of a parallel reality game. As illustrated, the virtual world 110 includes a geography that parallels the geography of the real world 100. In particular, a range of coordinates defining a geographic area or space in the real world 100 is mapped to a corresponding range of coordinates defining a virtual space in the virtual world 110. The range of coordinates in the real world 100 can be associated with a town, neighborhood, city, campus, locale, a country, continent, the entire globe, or other geographic area. Each geographic coordinate in the range of geographic coordinates is mapped to a corresponding coordinate in a virtual space in the virtual world 110.

A player's position in the virtual world 110 corresponds to the player's position in the real world 100. For instance, player A located at position 112 in the real world 100 has a corresponding position 122 in the virtual world 110. Similarly, player B located at position 114 in the real world 100 has a corresponding position 124 in the virtual world 110. As the players move about in a range of geographic coordinates in the real world 100, the players also move about in the range of coordinates defining the virtual space in the virtual world 110. In particular, a positioning system (e.g., a GPS system, a localization system, or both) associated with a mobile computing device carried by the player can be used to track a player's position as the player navigates the range of geographic coordinates in the real world 100. Data associated with the player's position in the real world 100 is used to update the player's position in the corresponding range of coordinates defining the virtual space in the virtual world 110. In this manner, players can navigate along a continuous track in the range of coordinates defining the virtual space in the virtual world 110 by simply traveling among the corresponding range of geographic coordinates in the real world 100 without having to check in or periodically update location information at specific discrete locations in the real world 100.

The location-based game can include game objectives requiring players to travel to or interact with various virtual elements or virtual objects scattered at various virtual locations in the virtual world 110. A player can travel to these virtual locations by traveling to the corresponding location of the virtual elements or objects in the real world 100. For instance, a positioning system can track the position of the player such that as the player navigates the real world 100, the player also navigates the parallel virtual world 110. The player can then interact with various virtual elements and objects at the specific location to achieve or perform one or more game objectives.

A game objective may have players interacting with virtual elements 130 located at various virtual locations in the virtual world 110. These virtual elements 130 can be linked to landmarks, geographic locations, or objects 140 in the real world 100. The real-world landmarks or objects 140 can be works of art, monuments, buildings, businesses, libraries, museums, or other suitable real-world landmarks or objects. Interactions include capturing, claiming ownership of, using some virtual item, spending some virtual currency, etc. To capture these virtual elements 130, a player travels to the landmark or geographic locations 140 linked to the virtual elements 130 in the real world and performs any necessary interactions (as defined by the game's rules) with the virtual elements 130 in the virtual world 110. For example, player A may have to travel to a landmark 140 in the real world 100 to interact with or capture a virtual element 130 linked with that particular landmark 140. The interaction with the virtual element 130 can require action in the real world, such as taking a photograph or verifying, obtaining, or capturing other information about the landmark or object 140 associated with the virtual element 130.

Game objectives may require that players use one or more virtual items that are collected by the players in the location-based game. For instance, the players may travel the virtual world 110 seeking virtual items 132 (e.g. weapons, creatures, power ups, or other items) that can be useful for completing game objectives. These virtual items 132 can be found or collected by traveling to different locations in the real world 100 or by completing various actions in either the virtual world 110 or the real world 100 (such as interacting with virtual elements 130, battling non-player characters or other players, or completing quests, etc.). In the example shown in FIG. 1, a player uses virtual items 132 to capture one or more virtual elements 130. In particular, a player can deploy virtual items 132 at locations in the virtual world 110 near to or within the virtual elements 130. Deploying one or more virtual items 132 in this manner can result in the capture of the virtual element 130 for the player or for the team/faction of the player.

In one particular implementation, a player may have to gather virtual energy as part of the parallel reality game. Virtual energy 150 can be scattered at different locations in the virtual world 110. A player can collect the virtual energy 150 by traveling to (or within a threshold distance of) the location in the real world 100 that corresponds to the location of the virtual energy in the virtual world 110. The virtual energy 150 can be used to power virtual items or perform various game objectives in the game. A player that loses all virtual energy 150 may be disconnected from the game or prevented from playing for a certain amount of time or until they have collected additional virtual energy 150.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing their locations.

Figure 2:
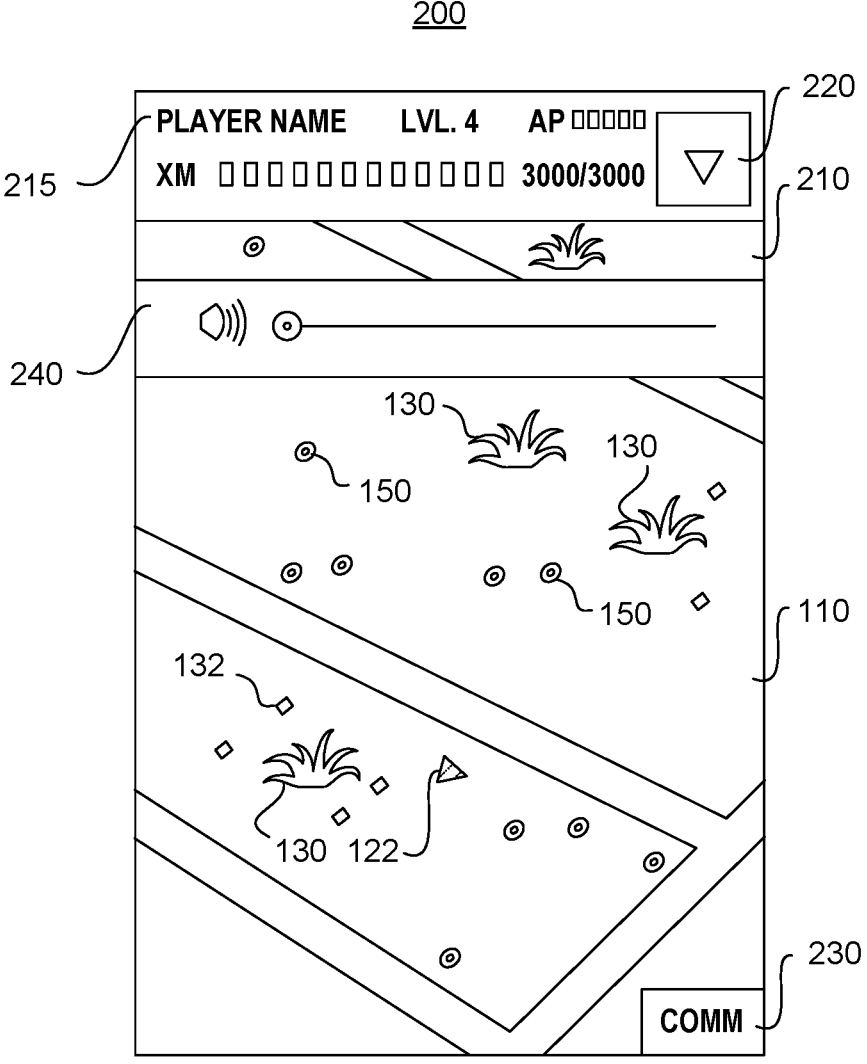
FIG. 2 depicts an exemplary game interface of a parallel reality game, according to one embodiment.

FIG. 2 depicts one embodiment of a game interface 200 that can be presented (e.g., on a player's smartphone) as part of the interface between the player and the virtual world 110. The game interface 200 includes a display window 210 that can be used to display the virtual world 110 and various other aspects of the game, such as player position 122 and the locations of virtual elements 130, virtual items 132, and virtual energy 150 in the virtual world 110. The user interface 200 can also display other information, such as game data information, game communications, player information, client location verification instructions and other information associated with the game. For example, the user interface can display player information 215, such as player name, experience level, and other information. The user interface 200 can include a menu 220 for accessing various game settings and other information associated with the game. The user interface 200 can also include a communications interface 230 that enables communications between the game system and the player and between one or more players of the parallel reality game.

According to aspects of the present disclosure, a player can interact with the parallel reality game by carrying a client device around in the real world. For instance, a player can play the game by accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 200 can include non-visual elements that allow a user to interact with the game. For instance, the game interface can provide audible notifications to the player when the player is approaching a virtual element or object in the game or when an important event happens in the parallel reality game. In some embodiments, a player can control these audible notifications with audio control 240. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

Example Gaming System

Figure 3:
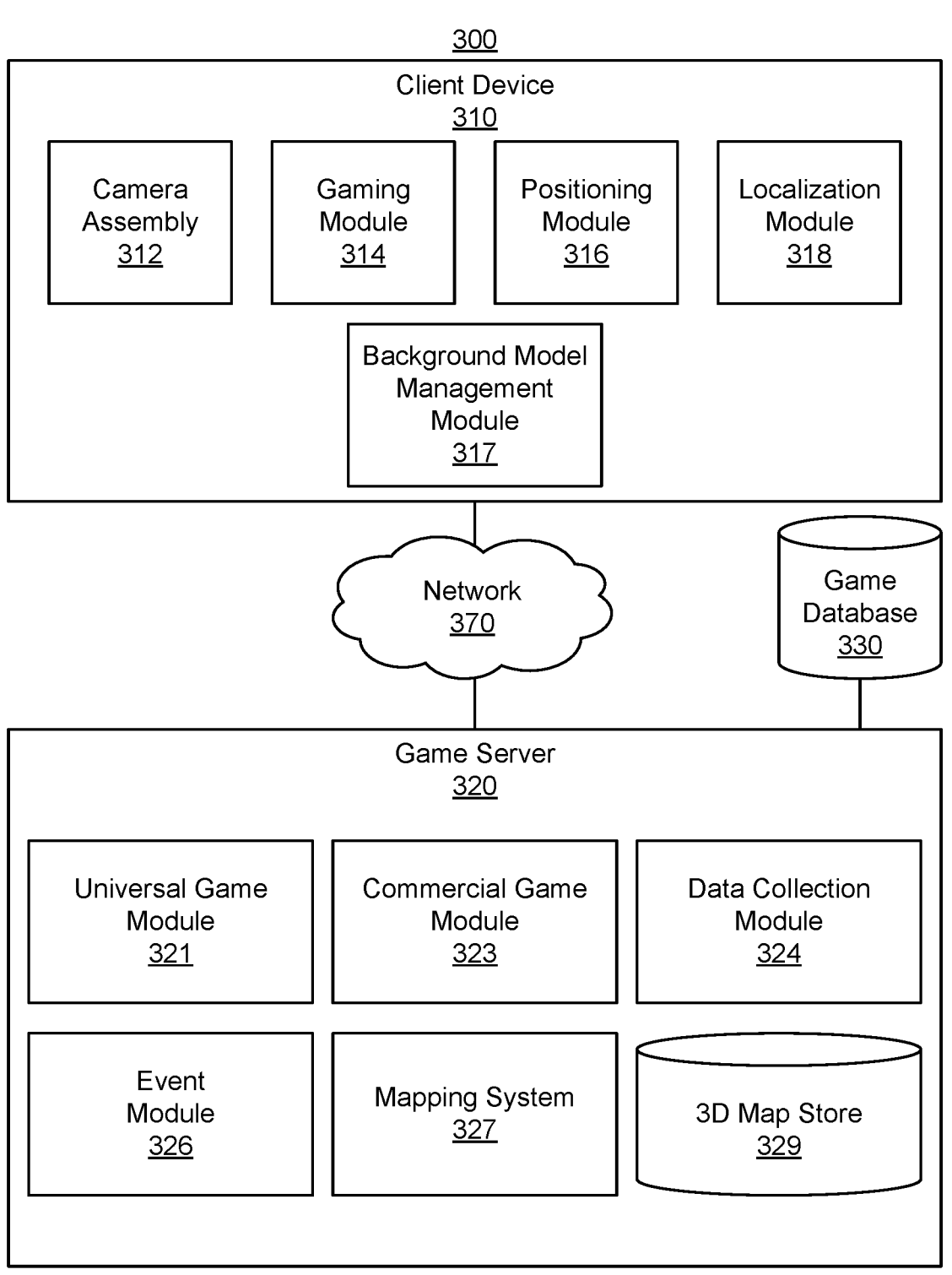
FIG. 3 is a block diagram of a networked computing environment suitable for generating and using a background model, according to one embodiment.

FIG. 3 illustrates one embodiment of a networked computing environment 300. The networked computing environment 300 uses a client-server architecture, where a game server 320 communicates with a client device 310 over a network 370 to provide a parallel reality game to a player at the client device 310. The networked computing environment 300 also may include other external systems such as sponsor/advertiser systems or business systems. Although only one client device 310 is shown in FIG. 3, any number of client devices 310 or other external systems may be connected to the game server 320 over the network 370. Furthermore, the networked computing environment 300 may contain different or additional elements and functionality may be distributed between the client device 310 and the server 320 in different manners than described below.

The networked computing environment 300 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 310 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 310.

A client device 310 can be any portable computing device capable for use by a player to interface with the game server 320. For instance, a client device 310 is preferably a portable wireless device that can be carried by a player, such as a smartphone, portable gaming device, augmented reality (AR) headset, cellular phone, tablet, personal digital assistant (PDA), navigation system, handheld GPS system, or other such device. For some use cases, the client device 310 may be a less-mobile device such as a desktop or a laptop computer. Furthermore, the client device 310 may be a vehicle with a built-in computing device.

The client device 310 communicates with the game server 320 to provide sensory data of a physical environment. In one embodiment, the client device 310 includes a camera assembly 312, a gaming module 314, positioning module 316, background management module 317, and localization module 318. The client device 310 also includes a network interface (not shown) for providing communications over the network 370. In various embodiments, the client device 310 may include different or additional components, such as additional sensors, display, and software modules, etc.

The camera assembly 312 includes one or more cameras which can capture image data. The cameras capture image data describing a scene of the environment surrounding the client device 310 with a particular pose (the location and orientation of the camera within the environment). The camera assembly 312 may use a variety of photo sensors with varying color capture ranges and varying capture rates. Similarly, the camera assembly 312 may include cameras with a range of different lenses, such as a wide-angle lens or a telephoto lens. The camera assembly 312 may be configured to capture single images or multiple images as frames of a video.

The client device 310 may also include additional sensors for collecting data regarding the environment surrounding the client device, such as movement sensors, accelerometers, gyroscopes, barometers, thermometers, light sensors, microphones, etc. The image data captured by the camera assembly 312 can be appended with metadata describing other information about the image data, such as additional sensory data (e.g. temperature, brightness of environment, air pressure, location, pose etc.) or capture data (e.g. exposure length, shutter speed, focal length, capture time, etc.).

The gaming module 314 provides a player with an interface to participate in the parallel reality game. The game server 320 transmits game data over the network 370 to the client device 310 for use by the gaming module 314 to provide a local version of the game to a player at locations remote from the game server. In one embodiment, the gaming module 314 presents a user interface on a display of the client device 310 that depicts a virtual world (e.g. renders imagery of the virtual world) and allows a user to interact with the virtual world to perform various game objectives. In some embodiments, the gaming module 314 presents images of the real world (e.g., captured by the camera assembly 312) augmented with virtual elements from the parallel reality game. In these embodiments, the gaming module 314 may generate or adjust virtual content according to other information received from other components of the client device 310. For example, the gaming module 314 may adjust a virtual object to be displayed on the user interface according to a depth map of the scene captured in the image data.

The gaming module 314 can also control various other outputs to allow a player to interact with the game without requiring the player to view a display screen. For instance, the gaming module 314 can control various audio, vibratory, or other notifications that allow the player to play the game without looking at the display screen.

The positioning module 316 can be any device or circuitry for determining the position of the client device 310. For example, the positioning module 316 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

As the player moves around with the client device 310 in the real world, the positioning module 316 tracks the position of the player and provides the player position information to the gaming module 314. The gaming module 314 updates the player position in the virtual world associated with the game based on the actual position of the player in the real world. Thus, a player can interact with the virtual world simply by carrying or transporting the client device 310 in the real world. In particular, the location of the player in the virtual world can correspond to the location of the player in the real world. The gaming module 314 can provide player position information to the game server 320 over the network 370. In response, the game server 320 may enact various techniques to verify the location of the client device 310 to prevent cheaters from spoofing their locations. It should be understood that location information associated with a player is utilized only if permission is granted after the player has been notified that location information of the player is to be accessed and how the location information is to be utilized in the context of the game (e.g. to update player position in the virtual world). In addition, any location information associated with players is stored and maintained in a manner to protect player privacy.

The localization module 318 provides an additional or alternative way to determine the location of the client device 310. In one embodiment, the localization module 318 receives the location determined for the client device 310 by the positioning module 316 and refines it by determining a pose of one or more cameras of the camera assembly 312. The localization module 318 may use the location generated by the positioning module 316 to select a 3D map of the environment surrounding the client device 310 and localize against the 3D map. The localization module 318 may obtain the 3D map from local storage or from the game server 320. The 3D map may be a point cloud, mesh, or any other suitable 3D representation of the environment surrounding the client device 310. Alternatively, the localization module 318 may determine a location or pose of the client device 310 without reference to a coarse location (such as one provided by a GPS system), such as by determining the relative location of the client device 310 to another device.

In one embodiment, the localization module 318 applies a trained model to determine the pose of images captured by the camera assembly 312 relative to the 3D map. Thus, the localization model can determine an accurate (e.g., to within a few centimeters and degrees) determination of the position and orientation of the client device 310. The position of the client device 310 can then be tracked over time using dead reckoning based on sensor readings, periodic re-localization, or a combination of both. Having an accurate pose for the client device 310 may enable the gaming module 314 to present virtual content overlaid on images of the real world (e.g., by displaying virtual elements in conjunction with a real-time feed from the camera assembly 312 on a display) or the real world itself (e.g., by displaying virtual elements on a transparent display of an AR headset) in a manner that gives the impression that the virtual objects are interacting with the real world. For example, a virtual character may hide behind a real tree, a virtual hat may be placed on a real statue, or a virtual creature may run and hide if a real person approaches it too quickly.

The background management module 317 generates and uses a background model to identify sky background portions in images captured by the client device 310. The generation and use of a background model is described in further detail below.

The game server 320 includes one or more computing devices that provide game functionality to the client device 310. The game server 320 can include or be in communication with a game database 330. The game database 330 stores game data used in the parallel reality game to be served or provided to the client device 310 over the network 370.

The game data stored in the game database 330 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); or (8) any other data used, related to, or obtained during implementation of the parallel reality game. The game data stored in the game database 330 can be populated either offline or in real time by system administrators or by data received from users (e.g., players), such as from a client device 310 over the network 370.

In one embodiment, the game server 320 is configured to receive requests for game data from a client device 310 (for instance via remote procedure calls (RPCs)) and to respond to those requests via the network 370. The game server 320 can encode game data in one or more data files and provide the data files to the client device 310. In addition, the game server 320 can be configured to receive game data (e.g. player positions, player actions, player input, etc.) from a client device 310 via the network 370. The client device 310 can be configured to periodically send player input and other updates to the game server 320, which the game server uses to update game data in the game database 330 to reflect any and all changed conditions for the game.

In the embodiment shown in FIG. 3, the game server 320 includes a universal game module 322, a commercial game module 323, a data collection module 324, an event module 326, a mapping system 327, and a 3D map store 329. As mentioned above, the game server 320 interacts with a game database 330 that may be part of the game server or accessed remotely (e.g., the game database 330 may be a distributed database accessed via the network 370). In other embodiments, the game server 320 contains different or additional elements. In addition, the functions may be distributed among the elements in a different manner than described.

The universal game module 322 hosts an instance of the parallel reality game for a set of players (e.g., all players of the parallel reality game) and acts as the authoritative source for the current status of the parallel reality game for the set of players. As the host, the universal game module 322 generates game content for presentation to players (e.g., via their respective client devices 310). The universal game module 322 may access the game database 330 to retrieve or store game data when hosting the parallel reality game. The universal game module 322 may also receive game data from client devices 310 (e.g. depth information, player input, player position, player actions, landmark information, etc.) and incorporates the game data received into the overall parallel reality game for the entire set of players of the parallel reality game. The universal game module 322 can also manage the delivery of game data to the client device 310 over the network 370. In some embodiments, the universal game module 322 also governs security aspects of the interaction of the client device 310 with the parallel reality game, such as securing connections between the client device and the game server 320, establishing connections between various client devices, or verifying the location of the various client devices 310 to prevent players cheating by spoofing their location.

The commercial game module 323 can be separate from or a part of the universal game module 322. The commercial game module 323 can manage the inclusion of various game features within the parallel reality game that are linked with a commercial activity in the real world. For instance, the commercial game module 323 can receive requests from external systems such as sponsors/advertisers, businesses, or other entities over the network 370 to include game features linked with commercial activity in the real world. The commercial game module 323 can then arrange for the inclusion of these game features in the parallel reality game on confirming the linked commercial activity has occurred. For example, if a business pays the provider of the parallel reality game an agreed upon amount, a virtual object identifying the business may appear in the parallel reality game at a virtual location corresponding to a real-world location of the business (e.g., a store or restaurant).

The data collection module 324 can be separate from or a part of the universal game module 322. The data collection module 324 can manage the inclusion of various game features within the parallel reality game that are linked with a data collection activity in the real world. For instance, the data collection module 324 can modify game data stored in the game database 330 to include game features linked with data collection activity in the parallel reality game. The data collection module 324 can also analyze data collected by players pursuant to the data collection activity and provide the data for access by various platforms.

The event module 326 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The mapping system 327 generates a 3D map of a geographical region based on a set of images. The 3D map may be a point cloud, polygon mesh, or any other suitable representation of the 3D geometry of the geographical region. The 3D map may include semantic labels providing additional contextual information, such as identifying objects tables, chairs, clocks, lampposts, trees, etc.), materials (concrete, water, brick, grass, etc.), or game properties (e.g., traversable by characters, suitable for certain in-game actions, etc.). In one embodiment, the mapping system 327 stores the 3D map along with any semantic/contextual information in the 3D map store 329. The 3D map may be stored in the 3D map store 329 in conjunction with location information (e.g., GPS coordinates of the center of the 3D map, a ringfence defining the extent of the 3D map, or the like). Thus, the game server 320 can provide the 3D map to client devices 310 that provide location data indicating they are within or near the geographic area covered by the 3D map.

The network 370 can be any type of communications network, such as a local area network (e.g. intranet), wide area network (e.g. Internet), or some combination thereof. The network can also include a direct connection between a client device 310 and the game server 320. In general, communication between the game server 320 and a client device 310 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Example Methods of Generating and Using a Background Model

Figure 4:
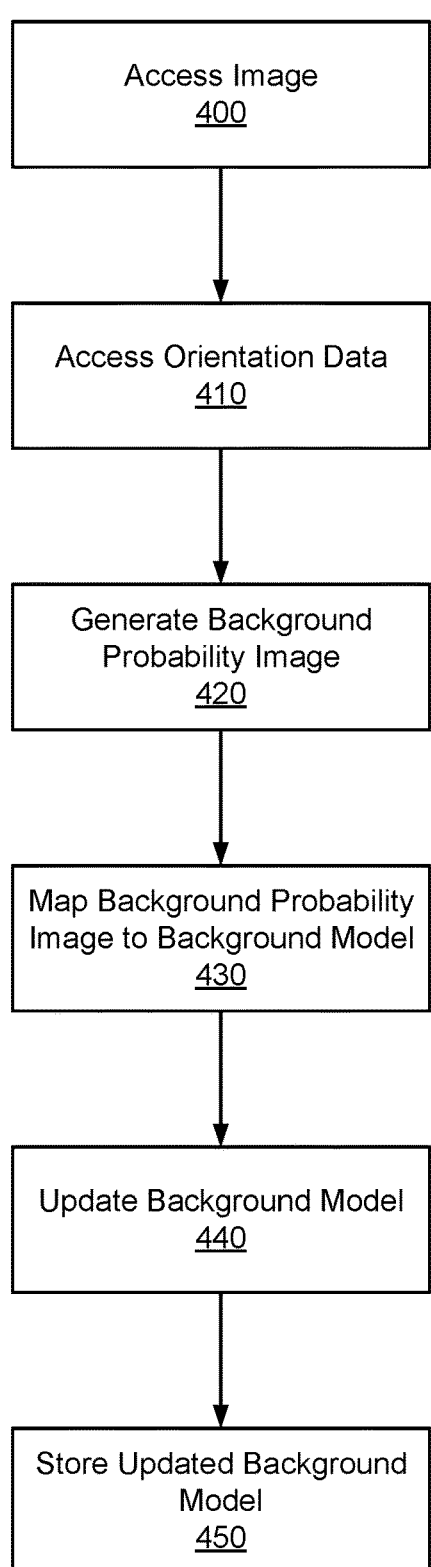
FIG. 4 is a flowchart illustrating an example method of generating or updating a background model, according to one embodiment.

FIG. 4 is a flowchart illustrating an example method of generating or updating a background model, according to one embodiment. The steps of FIG. 4 are illustrated from the perspective of the client device performing the method. However, some or all of the steps may be performed by other entities or components, such as the game server. In addition, some embodiments may perform the steps in parallel, perform the steps in different orders, or perform different steps.

The client device accesses an image 400 that was captured by the client device. The accessed image may be a single image captured by the client device or may be a frame of a video captured by the client device. The image depicts an environment around the client device, and includes a foreground portion and a background portion. The foreground portion is a set of pixels of the image that depicts persons or objects near the client device, and the background portion is a set of pixels of the image that depicts persons or objects that are far from the client device.

The background portion may include sub portions: a sky background portion and a non-sky background portion. The sky background portion of the image is a portion of the image that depicts the sky. For example, the sky background portion may depict the atmosphere, clouds, celestial bodies (e.g., the Sun, the Moon, or stars), meteorological phenomena (e.g., rain or lightning), or objects that are flying or floating in the sky (e.g., balloons or airplanes). The non-sky background portion of the image is a portion of the image that depicts background persons or objects that are not in the sky. For example, the non-sky background portion may depict landscape features (e.g., hills, seas, or lakes), buildings, plants, or people. In some embodiments, the background portion of the image is entirely made up by the sky background portion and the non-sky background portion.

The client device accesses 410 orientation data that describes an orientation of the client device when the accessed image was captured. The orientation data may be sensor data captured by a sensor of the client device. For example, the orientation data may include data from an inertial measurement unit, a GNSS sensor, or a magnetometer. In some embodiments, the orientation data comprises processed sensor data that indicates an estimated pose of the client device. U.S. patent application Ser. No. 18/301,665, filed Apr. 17, 2023 and entitled "Estimating Pose for a Client Device using a Pose Prior Model," describes an example method for determining an orientation of a client device that may be used here, and is incorporated by reference.

The client device generates 420 a background probability image for the accessed image. A background probability image is an image whose pixels indicate a likelihood that a corresponding pixel in the accessed image depicts the sky. The client device generates the background probability image by applying a background detection model to the accessed image. The background detection model is a machine-learning model (e.g., a neural network) that is trained to identify the pixels in an image that correspond to a sky background portion. For example, the background detection model may be a semantic segmentation model that is trained to segment the accessed image based on whether pixels are in the sky background portion. The background detection model generates a likelihood for each pixel in the accessed image that the pixel corresponds to the sky background portion. The background detection model thereby outputs the likelihoods for all of the pixels in the accessed image to generate the background probability image.

Figure 5A:
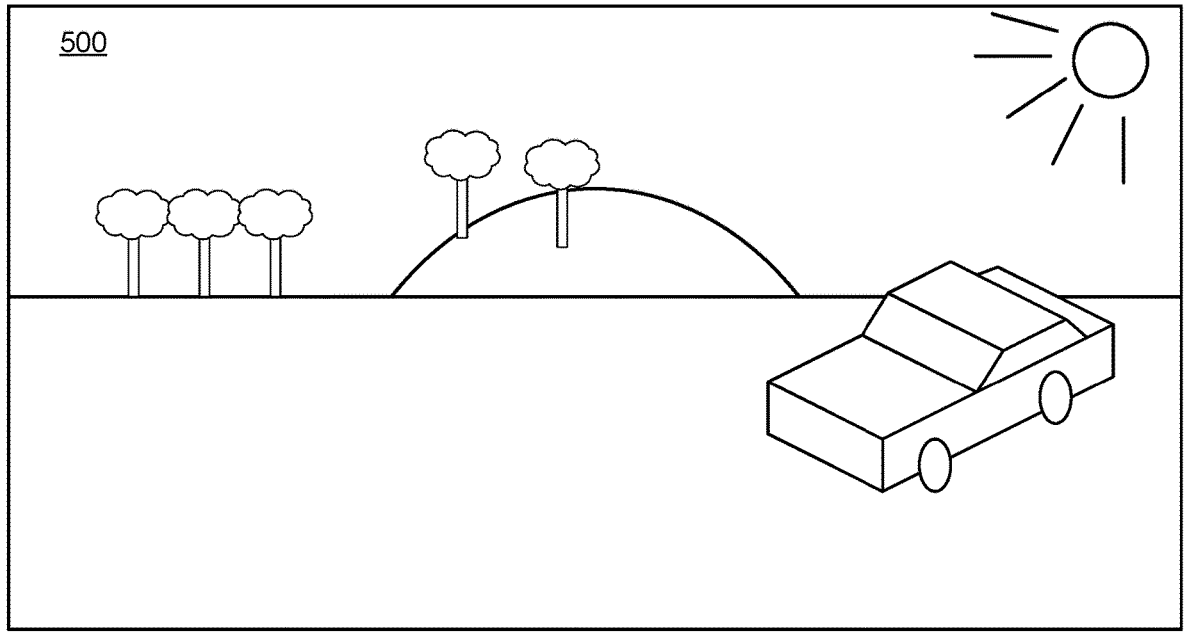
FIGS. 5A and 5B illustrate an example image and an example background probability image, according to one embodiment.
Figure 5B:
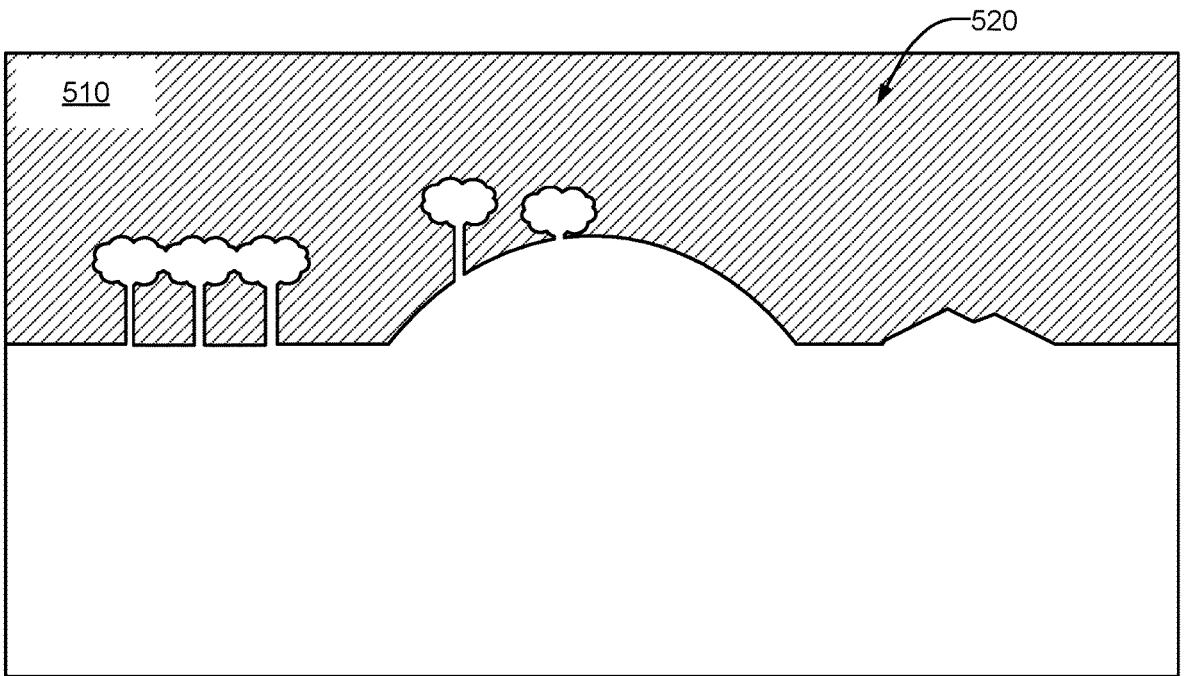

FIGS. 5A and 5B illustrate an example image 500 and an example background probability image 510, in accordance with some embodiments. The illustrated background probability image 510 is a probability image that is generated based on the illustrated image 500. The shaded portion 520 of the background probability image 510 is the identified sky background portion of the image 500. As noted above, the shaded portion 520 may be uniformly labeled as representing the sky. Alternatively, each pixel in background probability image 510 may be associated with a likelihood that each pixel depicts the sky, and the shaded portion 520 may be the set of pixels whose associated likelihoods exceed a threshold.

The client device uses the background probability image to update a background model. A background model is a model that represents where the sky is visible for the client device. In some embodiments, the background model includes a three-dimensional virtual model that is positioned, within a virtual space, at a large distance from a virtual pose for the client. For example, the background model may include a plane that is facing the client device or a rectangular prism that is positioned around the client device.

The background model may partitioned into portions or segments that each store a score indicating whether the corresponding portion represents the sky. For example, the background model may include tiled regular portions (e.g., squares or rectangular portions) where each portion has an associated sky score. A portion's sky score may be a binary value indicating whether the portion corresponds to the sky. Alternatively, the sky scores may represent a likelihood that a corresponding portion represents the sky, and thus the sky scores may have a range of values.

To update the background model using the background probability image, the client devices maps 430 the background probability image onto the background model. The client device uses the orientation data to determine an orientation of the client device in the physical world and uses this physical orientation to determine a virtual pose of the client device relative to the background model. The client device uses the virtual pose to determine a field of view of the client device that is captured by the accessed image and thereby determines which pixels of the accessed image overlap with which portions of the background model.

The client device updates 440 the background model based on the mapping of the background probability image onto the background model. For example, the client device may identify which portions of the background model overlap with the background probability image. For each of the portions of the background model, the client device determines which pixels of the background probability image overlap with the portion and updates the corresponding sky score of the portion based on the values of the pixels in the background probability image. For example, the client device may average the values of the pixels that overlap a portion and update the portion's sky value based on that average. In embodiments where the client device iteratively updates the background model on images over time, the client device may store a series of background probability image pixel values for a background model portion and may compute a sky score for the portion based on the series of pixel values. For example, the client device may weight each pixel value based on how much time has elapsed since that pixel value was added to the series and may compute a weighted average of the pixel values to compute the sky score for a portion. Similarly, the client device may generate and update a probability distribution for each portion based on their corresponding pixel values.

Figure 6:
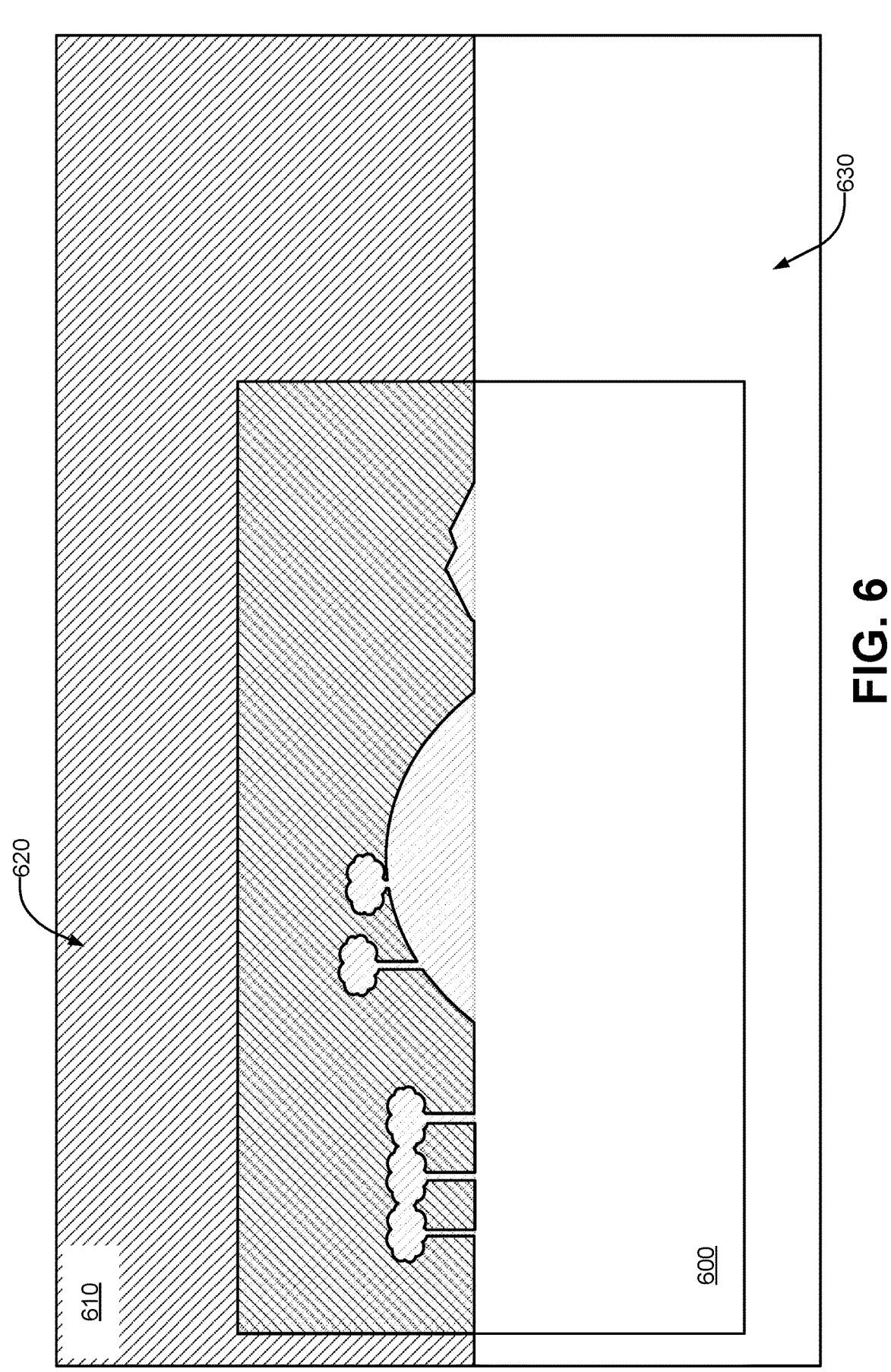
FIG. 6 illustrates an example background probability image mapped onto a background model, according to one embodiment.

FIG. 6 illustrates an example background probability image 600 mapped onto a background model 610, in accordance with some embodiments. For simplicity, the background model 610 illustrated in FIG. 6 is a plane but, as noted above, the background model could be a rectangular prism or any other 3D shape. The background model 610 may be initialized using a heuristic that the portion 620 above some horizon is the sky whereas the portion 630 below the horizon is not the sky. However, as illustrated, the background probability image 600 has additional information indicating that certain landscape features (e.g., a hill and trees) block part of the sky, so the client device may update the background model to indicate that those portions of the background model do not depict the sky.

The client device stores 450 the updated background model for use in identifying sky background portions of future images captured by the client device. A method for applying the background model is described in further detail below. The client device may store the background model for as long as the client device maintains an application session with an online system, such a game server. The client device may continually update the background model using new images captured by the client device while the client device maintains the application session, e.g., by applying the method described above. In some embodiments, the client device deletes the background model when the client device ends the application session or when the client device has moved more than some threshold distance from some location within the physical world.

Figure 7:
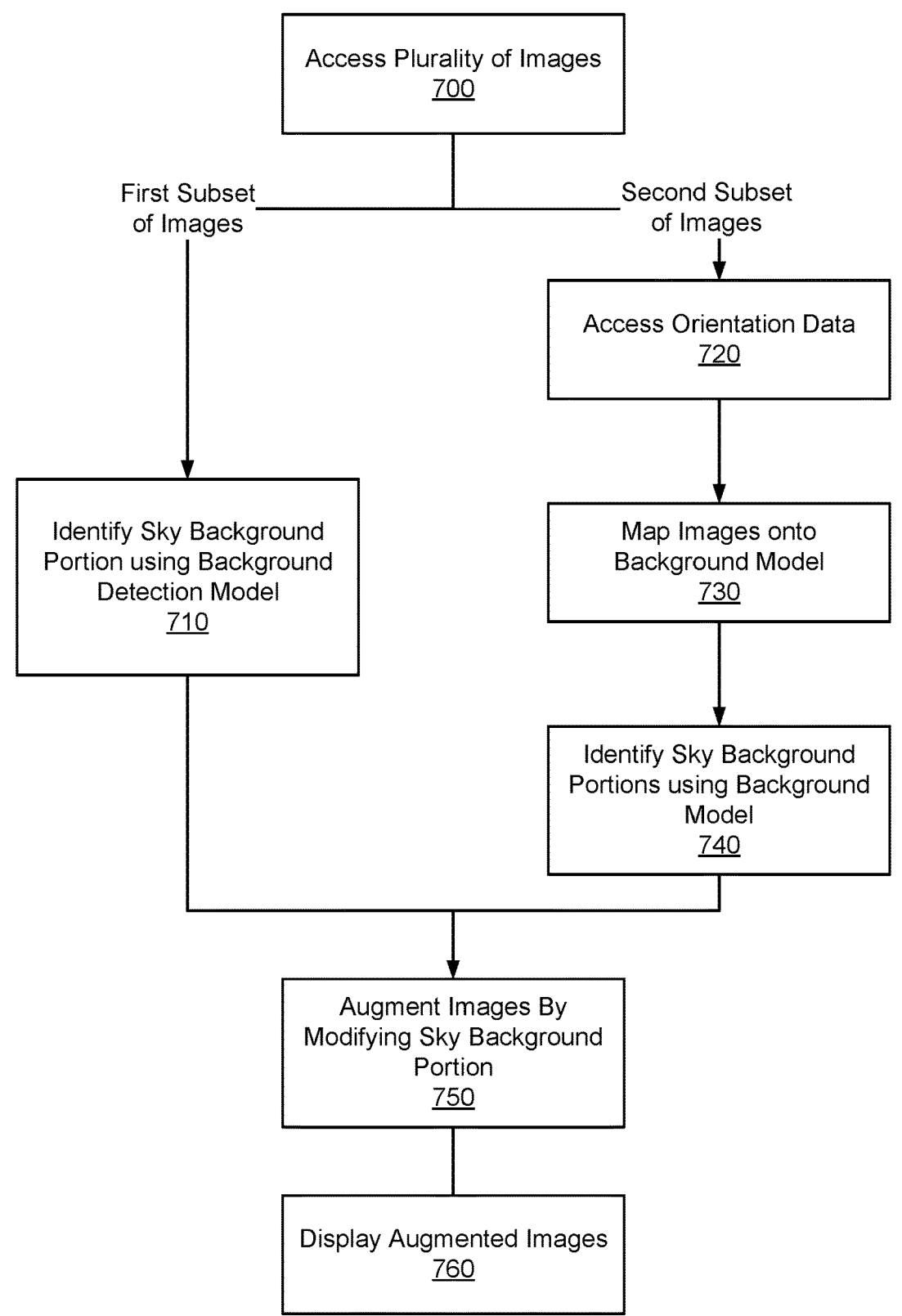
FIG. 7 is a flowchart illustrating an example method of applying a background model to provide AR content, according to one embodiment.

FIG. 7 is a flowchart illustrating an example method of applying a background model to provide AR content, according to one embodiment. The steps of FIG. 7 are illustrated from the perspective of the client device performing the method. However, some or all of the steps may be performed by other entities or components, such as the game server. In addition, some embodiments may perform the steps in parallel, perform the steps in different orders, or perform different steps.

A client device accesses 700 a plurality of images. The plurality of images may be frames of a video captured by the client device as AR content is provided to the user. As described above, the images depict an environment around the client device and include a foreground and background portion. The background portion also may include a sky background portion and a non-sky background portion.

The client device identifies a sky background portion in each of the plurality of images. In the method illustrated in FIG. 7, the client device applies a different process for different subsets of the plurality of images. The client device may randomly select images of the plurality of images for a first and second subset of images. Alternatively, where the client device is applying the described process to frames of a video captured by a client device, the client device may assign images to each subset on a set interval (e.g., every fifth or tenth frame is assigned to the first subset and the rest to the second subset) or may assign images to the first subset when an error score exceeds some threshold.

For a first subset of images, the client device identifies 710 the sky background portion by applying a background detection model to each of the first subset of images. As described above, a background detection model is a machine-learning model that is trained to identify pixels in an image that correspond to a sky background portion. In some embodiments, the client device updates a background model based on the output of the background detection model as applied to the first subset of images using a process such as the one described above with regards to FIG. 4.

For a second subset of images, the client device identifies the sky background portion of the images using a background model. The background model and how the background model may be generated is described above with regards to FIG. 4. To identify the sky background portion of each of the second subset of images, the client device accesses 720 orientation data captured by the client device in association with the image and uses the orientation data to map 730 the image onto the background model. For example, the client device may determine a pose of the client device relative to the background model based on the orientation data and may determine a field of view associated with the image. The client device may map that field of view onto the background model.

The client device identifies 740 the sky background portion of the image based on the mapping of the image onto the background model. The client device may determine the sky scores of portions of the image based on the orientation data and the background model (e.g., by determining the field of view associated with the image) and may use a threshold value of sky scores to determine which portion(s) of the image correspond to the sky background portion of the image.

Figure 8:
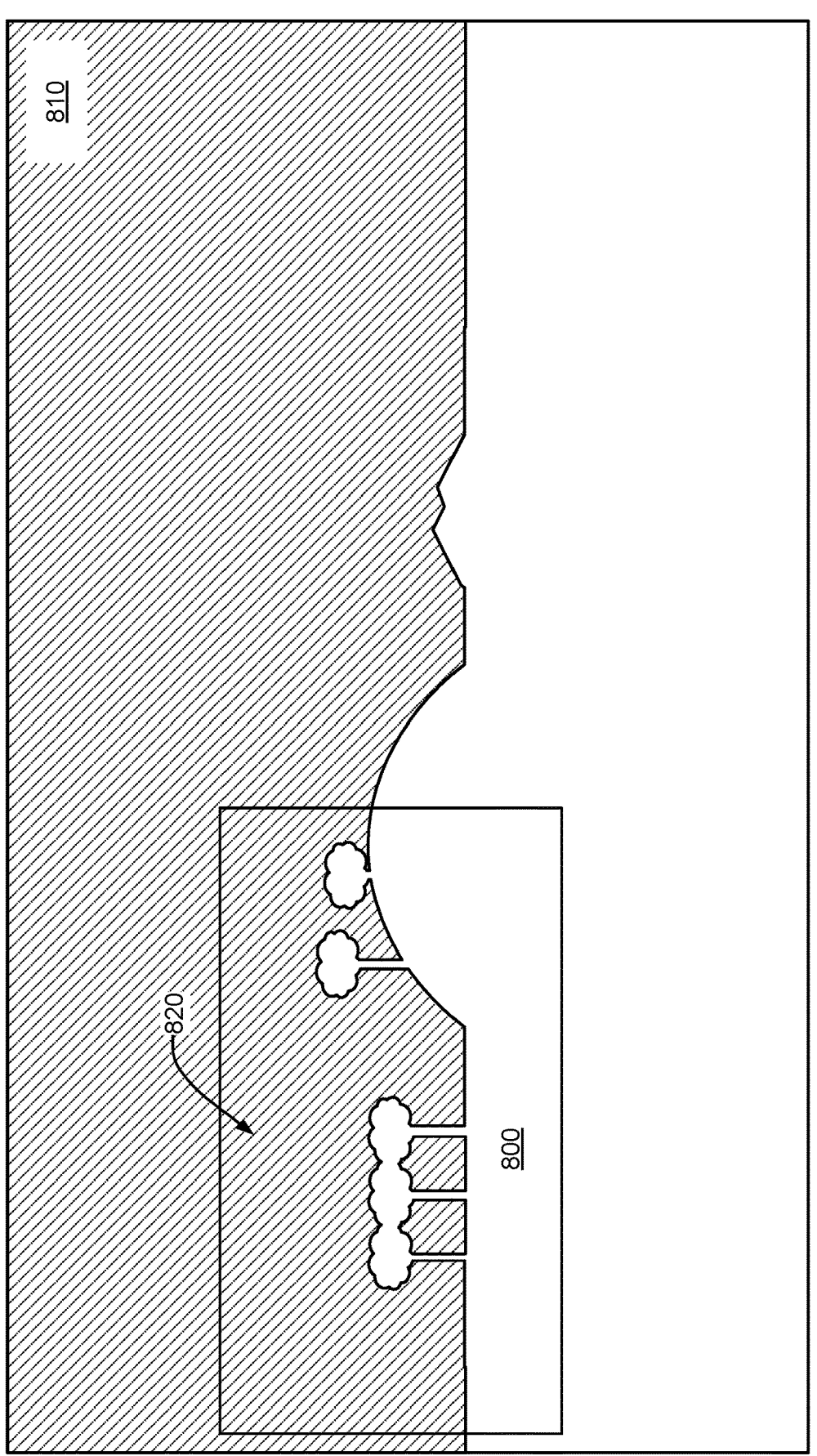
FIG. 8 illustrates an example image being mapped onto a background model to identify the sky background portion of the image, according to one embodiment.

FIG. 8 illustrates an example image 800 being mapped onto a background model 810 to identify the sky background portion 820 of the image 800, in accordance with some embodiments. As noted above, the client device may map the image 800 onto the background model 810 using the orientation data for the image and thereby use the mapping to identify the sky background portion 820 of the image.

In some embodiments, the client device performs occlusion detection to identify parts of the sky background portion that may actually be occluded by a foreground object. The background model may be simplified by only modeling the background and by not modeling the positions and structures of foreground objects. By not modeling foreground objects, the sky background portions of sequential images (e.g., frames in a video) remain mostly constant with positional movements of the client device and instead are instead predominantly effected by changes of the client device's orientation. These provide efficiency benefits for the client device in determining the sky background portion of images by reducing the complexity of determining where that portion is while the client device's orientation is staying relatively constant.

However, when the client device changes position or orientation, the field of view of the client device may start to capture foreground objects that occlude the sky background portion. A client device that simply uses a background model that does not model foreground objects may identify a portion of the image as a sky background portion and thus display content for the sky background portion over a foreground object. To address this problem, the client device may detect when foreground objects occlude the sky background portion and modify the initially identified sky background portion to remove pixels that represent those foreground objects.

In some embodiments, the client device uses a color distribution of image pixels within the sky background portion to detect an occlusion. The client device may generate a distribution of color values of pixels in the image that are within the sky background portion. For example, the client device may generate a probabilistic distribution of values for each of the three RGB values in image pixels that are within the sky background portion. The client device may use the color distribution to determine whether a foreground object is occluding the sky background portion by detecting pixels within the sky background portion that differ substantially from other pixels in the distribution. For example, the client device may determine whether a pixel has RGB values that deviate by some threshold amount from the average value for one or more of these values in the rest of the sky background portion. In embodiments where the accessed images are frames of a video, the client device may generate a color distribution for the sky background portion of the previous frame in the video to detect whether a foreground object is occluding the sky background portion.

The client device also may use certain heuristics to detect when a foreground object is occluding the sky background portion. For example, the client device may use thresholds for RGB values for image pixels to identify those pixels as depicting foreground objects rather than a sky background. These thresholds may represent that the sky background portion tends to have pixels that have the typical colors of the sky (e.g., blue, white, gray, or black) and therefore pixels within the sky background portion that substantially differ from these colors may be identified as actually representing foreground objects and therefore actually not part of the sky background portion. Similarly, the client device may use the horizon in some parts of the sky background portion as a heuristic to identify whether pixels in other parts of the sky background portion actually represent a foreground object. For example, the client device may detect a horizontal portion of the border of the sky background portion and may extrapolate a horizontal line representing the horizon across the image. The client device may determine that portions of the sky background portion that are below that horizontal line actually represent foreground objects and are not actually part of the sky background portion.

The client device augments 750 the images in the first and second subsets of images to include AR content using the identified sky background portion. For example, the client device may augment the images such that objects appear to be floating in the sky or may change the color of the sky. The client device displays 760 these augmented images to the user through a display of the client device.

Figure 9:
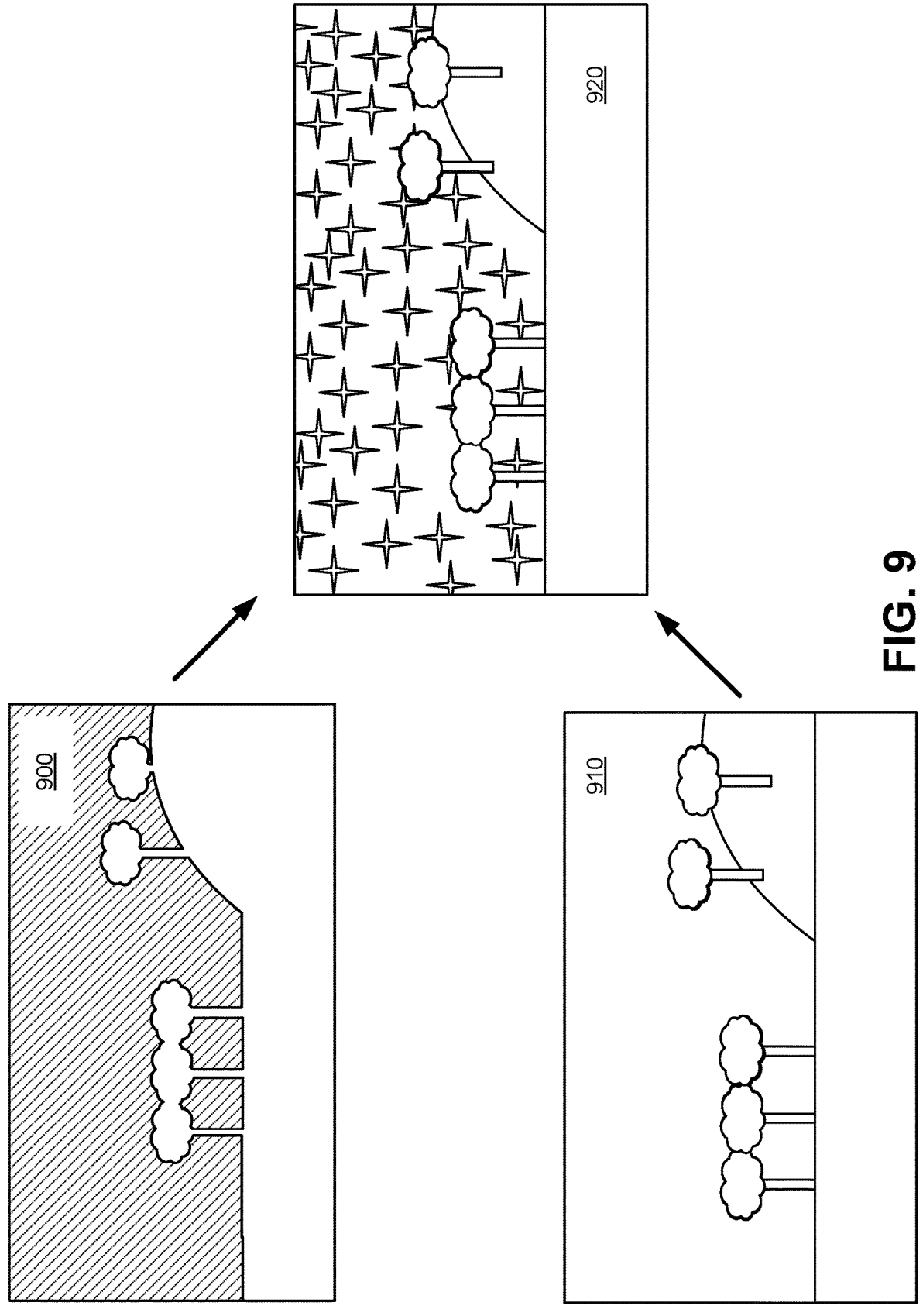
FIG. 9 illustrates how a client device may use an identified sky background portion to augment a captured image, according to one embodiment.

FIG. 9 illustrates how a client device may use an identified sky background portion 900 to augment a captured image 910, in accordance with some embodiments. The client device may use the sky background portion 900 to determine which portion of the captured image 910 should be augmented with AR content. The client device augments the captured image 910 to create an augmented image 920 to present to a user.

In some embodiments, the client device uses the sky background model to render AR objects to be located in the background. To handle foreground AR objects, the client device may use sensor data describing the pose of the client device in the physical world to render those objects. By differentiating how these different types of objects are rendered, the client device can more efficiently render AR objects relative to physical objects. For example, where an AR object is a background object to be displayed in the sky background portion, the client device can assume that all physical objects should be displayed in front of the AR object. Thus, the client device can reduce the computational resources required to present AR content in the background.

Depending on the AR content to be displayed to a user, an AR object may transition from the background to the foreground and vice versa. For example, an AR hot air balloon may start as a foreground object as it takes off, and then become a background object as it gets further away from the client device. The client device may use transition points in the AR content to determine when to render an AR object as a foreground object or as a background object. The transition points in the AR content indicate whether an AR object should be rendered as a foreground or background object and cause the client device to render the AR object accordingly. The transition points may have certain conditions that cause the client device to transition how an AR object is rendered. For example, a transition point may cause a transition in how an AR object is rendered based on how long the AR object has been displayed to the user (e.g., after a certain period of time, the AR object transitions from foreground to background) or based on the pose of the client device (e.g., when the AR object is moving relative to the client device and the distance between the client device's pose and the AR object passes some threshold).

While the description herein may primarily focus on generating and using a background model to identify a sky background portion, similar methods may be used to identify other background portions of an image. For example, the methods described above may be used to identify background portions corresponding to landscape features (e.g., hills, seas, or lakes), buildings, or plants.

ADDITIONAL CONSIDERATIONS

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by the following claims.

What is claimed is:

1. A computer-implemented method comprising:

accessing an image captured by a client device, wherein the image depicts an environment around the client device and wherein the image comprises a sky background portion and a non-sky background portion;

accessing orientation data describing an orientation of the client device when the accessed image was captured by the client device;

generating a background probability image for the accessed image by applying a background detection model to the accessed image, wherein the background detection model is a machine-learning model trained to identify pixels in an image that correspond to a sky background portion of the image;

mapping pixels of the background probability image to portions of a background model based on the orientation data, where the background model is a model that indicates where sky is visible by the client device;

updating portions of the background model based on the mapping of the background probability image; and storing the updated portions of the background model at the client device.

2. The method of claim 1, wherein the image is a frame of a video captured by the client device.

3. The method of claim 1, further comprising:

establishing an application session with an online system; and responsive to establishing the application session, initializing the background model.

4. The method of claim 1, wherein each pixel in the background probability image corresponds to a pixel in the accessed image, and where each pixel of the background probability image indicates whether the corresponding pixel in the accessed image depicts the sky.

5. The method of claim 4, wherein a subset of pixels of the background probability image are labeled as depicting the sky.

6. The method of claim 4, wherein each pixel of the background probability image comprises a likelihood that the corresponding pixel in the accessed image depicts the sky.

7. The method of claim 1, wherein mapping pixels of the background probability image comprises:

determining a field of view of the accessed image based on the orientation data.

8. The method of claim 1, wherein the background model comprises a 3D structure that is located a set distance from the client device.

9. The method of claim 1, wherein the background model comprises a rectangular prism.

10. The method of claim 1, wherein updating portions of the background model comprises:

updating probability distributions associated with the portions of the background model.

11. A non-transitory computer-readable medium storing instructions that, when executed by a computing system, causes the computing system to perform operations comprising:

accessing an image captured by a client device, wherein the image depicts an environment around the client device and wherein the image comprises a sky background portion and a non-sky background portion;

accessing orientation data describing an orientation of the client device when the accessed image was captured by the client device;

generating a background probability image for the accessed image by applying a background detection model to the accessed image, wherein the background detection model is a machine-learning model trained to identify pixels in an image that correspond to a sky background portion of the image;

mapping pixels of the background probability image to portions of a background model based on the orientation data, where the background model is a model that indicates where sky is visible by the client device;

updating portions of the background model based on the mapping of the background probability image; and storing the updated portions of the background model at the client device.

12. The computer-readable medium of claim 11, wherein the image is a frame of a video captured by the client device.

13. The computer-readable medium of claim 11, the operations further comprising:

establishing an application session with an online system; and responsive to establishing the application session, initializing the background model.

14. The computer-readable medium of claim 11, wherein each pixel in the background probability image corresponds to a pixel in the accessed image, and where each pixel of the background probability image indicates whether the corresponding pixel in the accessed image depicts the sky.

15. The computer-readable medium of claim 14, wherein a subset of pixels of the background probability image are labeled as depicting the sky.

16. The computer-readable medium of claim 14, wherein each pixel of the background probability image comprises a likelihood that the corresponding pixel in the accessed image depicts the sky.

17. The computer-readable medium of claim 11, wherein mapping pixels of the background probability image comprises:

determining a field of view of the accessed image based on the orientation data.

18. The computer-readable medium of claim 11, wherein the background model comprises a 3D structure that is located a set distance from the client device.

19. The computer-readable medium of claim 11, wherein the background model comprises a rectangular prism.

20. The computer-readable medium of claim 11, wherein updating portions of the background model comprises:

updating probability distributions associated with the portions of the background model.

* * * * *